United States Patent
Liu et al.

(10) Patent No.: US 10,169,322 B2
(45) Date of Patent: Jan. 1, 2019

(54) PERSONAL DICTIONARY

(71) Applicants: Alan Rulin Liu, Bartlett, IL (US); Gina Inan Liu, Bartlett, IL (US)

(72) Inventors: Alan Rulin Liu, Bartlett, IL (US); Gina Inan Liu, Bartlett, IL (US)

(73) Assignee: Dinky Labs, LLC, Bartlett, IL (US)

( * ) Notice: Subject to any disclaimer, the term of this patent is extended or adjusted under 35 U.S.C. 154(b) by 0 days.

(21) Appl. No.: 15/145,404

(22) Filed: May 3, 2016

(65) Prior Publication Data

US 2017/0322925 A1    Nov. 9, 2017

(51) Int. Cl.
*G06F 17/21* (2006.01)
*G06F 17/27* (2006.01)

(52) U.S. Cl.
CPC ............................... *G06F 17/2735* (2013.01)

(58) Field of Classification Search
CPC ............. G06F 17/2735; G06F 17/2795; G06F 17/30619; G06F 17/30952; G06N 5/02
USPC ....................................................... 704/9, 10
See application file for complete search history.

(56) References Cited

U.S. PATENT DOCUMENTS

| | | | |
|---|---|---|---|
| 6,393,389 B1 * | 5/2002 | Chanod | G06F 17/271 704/4 |
| 6,708,311 B1 * | 3/2004 | Berstis | G06F 17/273 715/205 |
| 6,785,869 B1 * | 8/2004 | Berstis | G06F 17/241 707/E17.005 |
| 8,027,989 B1 * | 9/2011 | Bruecken | G06F 17/2735 704/10 |
| 9,009,028 B2 * | 4/2015 | Puppin | G06F 17/2735 704/1 |
| 2004/0038527 A1 * | 2/2004 | Geusic | B82Y 20/00 438/675 |
| 2007/0112554 A1 * | 5/2007 | Goradia | G06F 17/2735 704/4 |
| 2008/0133217 A1 * | 6/2008 | Chan | G09B 19/06 704/5 |
| 2009/0240667 A1 * | 9/2009 | Baker | G06F 17/30056 |
| 2012/0150533 A1 * | 6/2012 | O'Neill | G06F 17/2735 704/9 |
| 2013/0007607 A1 * | 1/2013 | Caldwell | G06F 17/2276 715/259 |
| 2013/0159848 A1 * | 6/2013 | Banke | G06F 17/2735 715/259 |
| 2013/0211821 A1 * | 8/2013 | Tseng | G06F 17/273 704/9 |
| 2014/0067371 A1 * | 3/2014 | Liensberger | G06F 17/273 704/9 |
| 2014/0143665 A1 * | 5/2014 | Hauser | G06F 17/273 715/259 |
| 2014/0356821 A1 * | 12/2014 | Krom | G09B 5/02 434/176 |

(Continued)

*Primary Examiner* — Olujimi Adesanya
(74) *Attorney, Agent, or Firm* — Cozen O'Connor

(57) ABSTRACT

A method includes receiving, at a processor, a request to construct a word entry of a word. The method further includes collecting, by the processor, a user profile. The method further includes selecting, by the processor, one or more definition databases according to the user profile. The method further includes retrieving, by the processor, definitions of the word from the definition databases. The method further includes ranking, by the processor, the definitions retrieved from the definition databases.

17 Claims, 8 Drawing Sheets

(56) References Cited

U.S. PATENT DOCUMENTS

| | | | |
|---|---|---|---|
| 2015/0088493 A1* | 3/2015 | Thakore | G06F 17/2735 |
| | | | 704/10 |
| 2016/0078341 A1* | 3/2016 | Allen | G06N 5/022 |
| | | | 706/46 |
| 2016/0335248 A1* | 11/2016 | Mikheev | G06F 17/2705 |
| 2017/0186338 A1* | 6/2017 | Treves | G09B 5/06 |

* cited by examiner

PERSONAL DICTIONARY

FIELD OF THE DISCLOSURE

The instant disclosure relates generally to dictionary. More specifically, this disclosure relates to embodiments of apparatuses, systems, and methods to create a personal dictionary.

BACKGROUND

Dictionaries are consulted when a learner of a language desires to find out a meaning of a word. Some dictionaries are written in the same language as the desired word, e.g., an English dictionary for English words. Such dictionaries are inconvenient for non-native language learner because the texts/phrases that are used to explain the word of interest may include other words that the learner do not understand. The difficulty of understanding a dictionary increases when the desired word is about an abstract concept that is by nature hard to describe or does not even exist in the native language of the learner.

Embodiments and their equivalents disclosed herein provide solutions to create a personal dictionary that enhances the language learning efficiency.

SUMMARY

The instant disclosure relates generally to dictionary. More specifically, this disclosure relates to embodiments of apparatuses, systems, and methods to create a personal dictionary. According to one embodiment, a method includes receiving, at a processor, a request to construct a word entry of a word, wherein the processor is in data communication with one or more non-transitory memory mediums. The method includes retrieving, by the processor, a user profile from a non-transitory memory medium. The method includes compiling, by the processor, a list of one or more definition databases according to the user profile, wherein the list is stored in a partition of a non-transitory memory medium by the processor. The method includes retrieving, by the processor, definitions of the word from the definition databases on the list.

According to another embodiment, a method includes receiving, at a processor, a request to enter a personal definition of a word, wherein the processor is in data communication with one or more non-transitory memory mediums. The method includes storing, by the processor, the personal definition in a partition of a non-transitory memory medium dedicated for a personal dictionary. The method includes receiving, at the processor, a request to construct a word entry of the word. The method includes collecting, by the processor, a user profile. The method includes retrieving, by the processor, the personal definition of the word from the partition of the non-transitory memory medium dedicated for the personal dictionary. The method includes displaying, by the processor, the personal definition retrieved in a graphical user interface shown on an electronic display screen.

According to another embodiment, a computer program product includes a non-transitory computer-readable medium comprising instructions which, when executed by a processor of a computing system, cause the processor to perform the steps of: receiving a request to enter personal definition of a word; storing the personal definition in a partition of a non-transitory memory medium dedicated for a personal dictionary; receiving a request to construct a word entry of the word; collecting a user profile; retrieving the personal definition of the word from the partition of the non-transitory memory medium dedicated for the personal dictionary; and displaying the personal definition retrieved in a graphical user interface shown on an electronic display screen.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
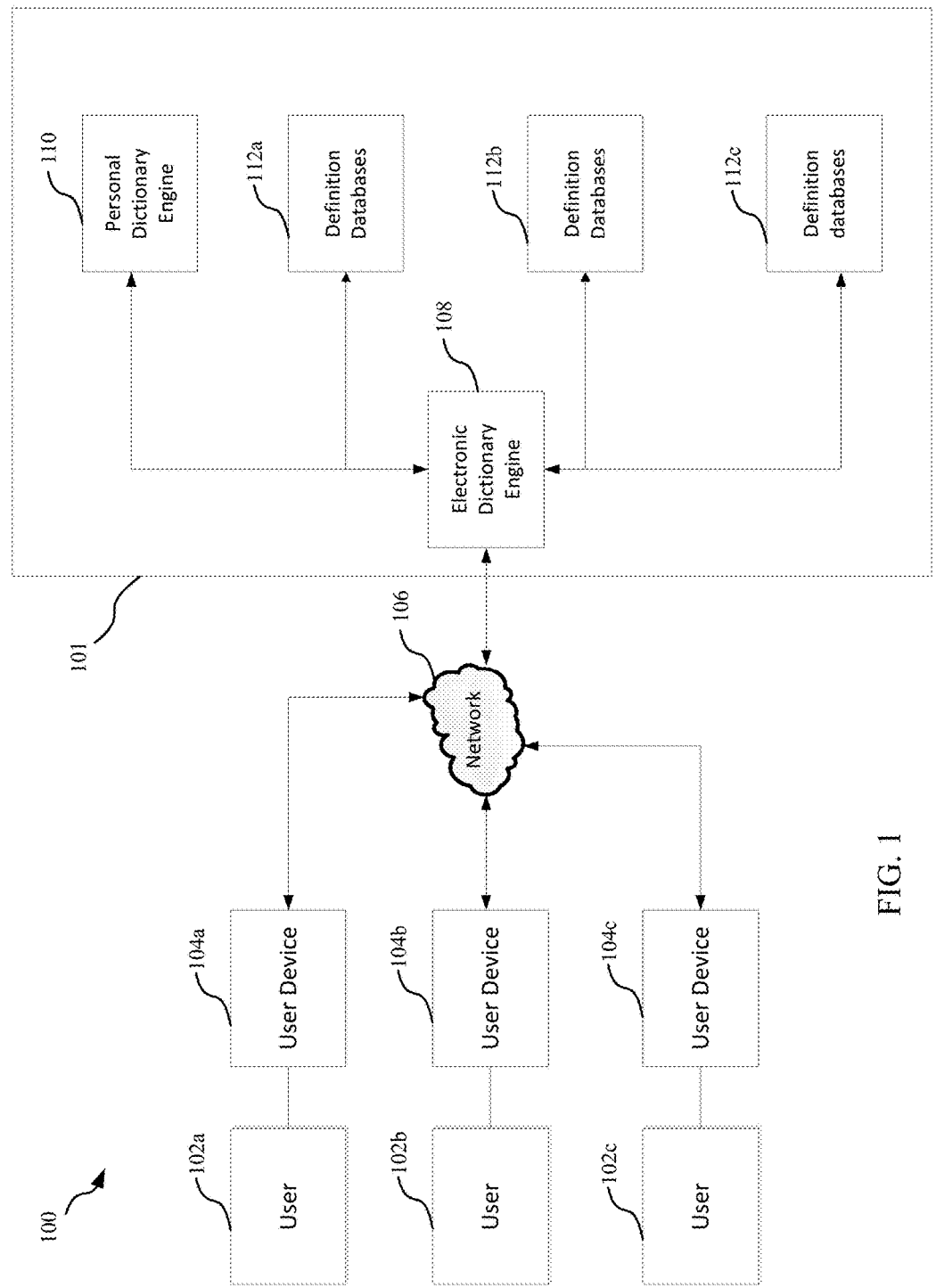
FIG. 1 is a schematic block diagram of a system of a personal dictionary according to one embodiment of the disclosure.

The systems, apparatuses, and methods of a personal dictionary disclosed herein provide definitions, text, examples, phrases, pictures, audio, personal notes, etc personalized for the user, so that the user may learn a desired word or phrase efficiently. In one embodiment, the personal dictionary is an electronic dictionary. When the user searches a word or phrase, the personal dictionary finds the profile of the user and determines appropriate definition databases based on the user's profile.

The term "definition database" means a database that stores words and definitions. By way of examples, a definition database may be Merriam-Webster dictionary, Cambridge dictionary, Yahoo dictionary, thefreedictionary.com, dictionary.com, etc.

In another embodiment, the personal dictionary is an online service that serves many users. When one user searches a word, in addition to existing definition databases, the personal dictionary may search definitions entered by other users, e.g., other users' personal dictionary. In the situation that no definition can be found, the user may create his/her own definitions of the word. The newly created definitions are stored in a dedicated personal definition database of the personal dictionary. Additionally, the user may also create personal notes for the searched word or phrase.

In one embodiment, initially, personal definitions and notes are only visible to the creator or limited users, e.g., friend, families, etc. Yet, later on, the personal definitions may be promoted to be visible to a wider population of users based on certain conditions, e.g., the number of likes, the number of followers of the user, the language proficiencies of the user, the personal profile of the user, the privacy settings of the user, etc.

In one embodiment, when a user searches for a word in one language, the personal dictionary may search for the definitions of the word in definition databases in another language. For example, the user searches for an English word, the personal dictionary may search the definition in Chinese, Hindu, German, Spanish, Japanese, Korean, etc.

In another embodiment, the user may enter his/her personal definition or notes in any language, regardless of the language the searched word belongs to. For example, the user searching for an English word can enter his or her own notes in Chinese, Hindu, German, Spanish, Japanese, Korean, etc.

It is specifically noted that any term, word, concept, content of the embodiments of the personal dictionary can be a combination of any languages without limitation.

Steps of any of the methods disclosed herein, e.g., methods 500 and 600, may be processor-executable instructions, for example, instructions written as programming codes. The instructions may be executed by any suitable processor, for example, x86 processor. The instructions may be programmed in any suitable computer language, for example, machine codes, assembly language codes, C language codes, C++ language codes, Fortran codes, Java codes, Matlab codes, or the like. The sequences of the steps of any of the methods disclosed herein, e.g., methods 500 and 600, may be changed without departing from the scope of the disclosure.

A "data connection" is an electrical and/or magnetic signal connection that communicates digital and/or analog signals. A data connection may be established through a wired connection, e.g., hard wires, USB, Ethernet, local area network, etc. A data connection may also be established through a wireless connection, e.g., IEEE 802.11x (WiFi), long term evolution (LTE), or the like. In FIGS. 1-3 and 6, the arrow lines indicate data connections.

FIG. 1 is a schematic block diagram of a system 100 of a personal dictionary according to one embodiment of the disclosure. The system 100 may include the electronic dictionary engine 200 in FIG. 2. In one embodiment, the electronic dictionary engine 108 may be the electronic dictionary engine 200. The system 100 may include the personal dictionary engine 300 in FIG. 3. In one embodiment, the personal dictionary engine 110 may be the personal dictionary engine 300. The system 100 may include the data structure 400 of a word entry in FIG. 4. The system 100 may implement the method 500 in FIG. 5. The system 100 may implement the method 600 in FIG. 6. The system 100 may include the graphical user interface 700 in FIG. 7. The system may include the graphical user interface 800 in FIG. 8.

The system 100 includes one or more users, e.g., user 102a, user 102b, and user 102c (hereinafter "user 102"). A user 102 may be a language learner who consults a personal dictionary 101. Each user 102 has a user device 104a, 104b, 104c (hereinafter "user device 104") connected to a network 106. A user device can be any electronic device, e.g., a mobile phone, a laptop, a desktop, a tablet, etc.

As shown in FIG. 1, the user 102 may access personal dictionary 101 with a user device 104 through the network 106. For example, the personal dictionary 101 can be a service provided on Internet.

In yet another embodiment, the personal dictionary 101 may be installed on the user device 104 and the network is not required for the user 102 to access the personal dictionary 101. For example, the personal dictionary 101 can be a piece of software installed on the user device 104.

As shown in FIG. 1, the personal dictionary 101 includes an electronic dictionary engine 108, personal dictionary engine 110, and zero or more definition databases 112a, 112b, 112c (hereinafter "definition database 112").

In yet another embodiment, the personal dictionary 101 may not necessarily include all of the content of the one or more definition databases 112. In one embodiment, the personal dictionary 101 may not include definition database at all. Instead, the personal dictionary 101 may access the content of the one or more definition databases 112 through Internet.

In one embodiment, when the user 102 searches a word, the search request may be sent to the electronic dictionary engine 108 of the personal dictionary 101. Before the electronic dictionary engine 108 searches the word in the definition databases 112, the electronic dictionary engine 108 may retrieve information from a user profile of the user. The user profile may include background information of the user, e.g., age, ethnicity, sex, education level, native language, physical location, other users of the personal dictionary 101 who are the user's friends, etc.

In one embodiment, the electronic dictionary engine 108 may select one or more appropriate definition databases 112 according to the user profile, e.g., age, ethnicity, sex, education level, native language, physical location, other users who friended the user, etc. The electronic dictionary engine 108 keeps a list of available definition databases and information about each definition database, such as the language of the definition text, target users, etc. The information about definition databases may be used in the selecting process. This selective process of the appropriate definition databases 112 enhances the learning efficiency of the user 102. For example, in one embodiment, if a user 102 is an elementary school student, the electronic dictionary engine 108 may select one or more definition databases 112 for kids. For example, in another embodiment, if a user 102 is a native Japanese speaker, the electronic dictionary engine 108 may select one or more definition databases 112 in Japanese. Once the appropriate definition databases 112 are selected, the electronic dictionary engine 108 then searches definitions of the word within the selected definition databases 112.

As shown in FIG. 1, the electronic dictionary engine 108 may also search in personal dictionary engine 110. In one embodiment, a personal dictionary engine 110 may include definition, text, picture, video, audio information provided by the user himself. In another embodiment, a personal dictionary engine 110 may also include definition, text, picture, video, audio information provided by other users, e.g., other users who are friends of the user 102, other users whom the user 102 is following, other users who have similar profile such as age, location or first language, etc.

The definitions of the requested word found in the definition databases 112 and/or personal dictionary engine 110 are sent back to the user device 104 for display. In one embodiment, before the information is sent back to the user device 104, the information is formatted. In one embodiment, the formatting process may rank the appropriateness of the definition databases and the definition from the highest ranked definition database 112 is displayed at the top of the message. The ranking process may use the user profile information.

In one embodiment, for example, a user 102 may be an elementary school student and a native Japanese speaker. Three different definition databases are selected: databases A, B, and C. Database A may be appropriate for elementary students and Japanese native speaker. Database A may be ranked the first. Database B may be appropriate for Japanese native speaker, but not appropriate for elementary students. Database B may be ranked the second. Database C may be appropriate for elementary students, but not appropriate for Japanese native speaker. Database C may be ranked the third. The formatted message sent back to the user device 104 may display the definition from database A at the top, database B at the middle, and database C at the bottom.

In one embodiment, if a user 102 is not satisfied with the definitions provided by the electronic dictionary engine 108, the user 102 may enter his/her own definitions and notes for the word. The personal dictionary 101 may store the user provided definitions and notes in the personal dictionary engine 110. Personal dictionary engine 110 may associate personal definitions and notes with the searched word or phrase. In one embodiment, in a subsequence search, the electronic dictionary engine 108 may find the definitions and notes in the personal dictionary engine 110 and display the personal definition and notes on the user device 104.

In one embodiment, the definition of a word provided by a definition database 112 or by the user 102 him/herself may include: functional labels, definition texts, videos, images, comics, jokes, stories, sentences from an article, tips for memorizing the word or phrase, etc. The definition may also comprise ancillary information such as location of the user and time when the definition is created.

In another embodiment, a user 102a may share a definition to other users 102b, 102c. The shared definition may be his/her personal definition or retrieved from a definition database 112. In one embodiment, the electronic dictionary 108 may send an URL to users 102b, 102c through an email or text message. The webpage directed to by the URL may include the definition user 102a wish to share with users 102b and 102c. In one embodiment, upon clicking the URL, user 102b and 102c may have the option to add the definition to their personal dictionary.

In another embodiment, user 102b and 102c may have the option to "like" any of the definitions in the personal dictionary of user 102a. Once a definition is liked, the definition is stored in the user's personal dictionary engine 110.

Figure 2:
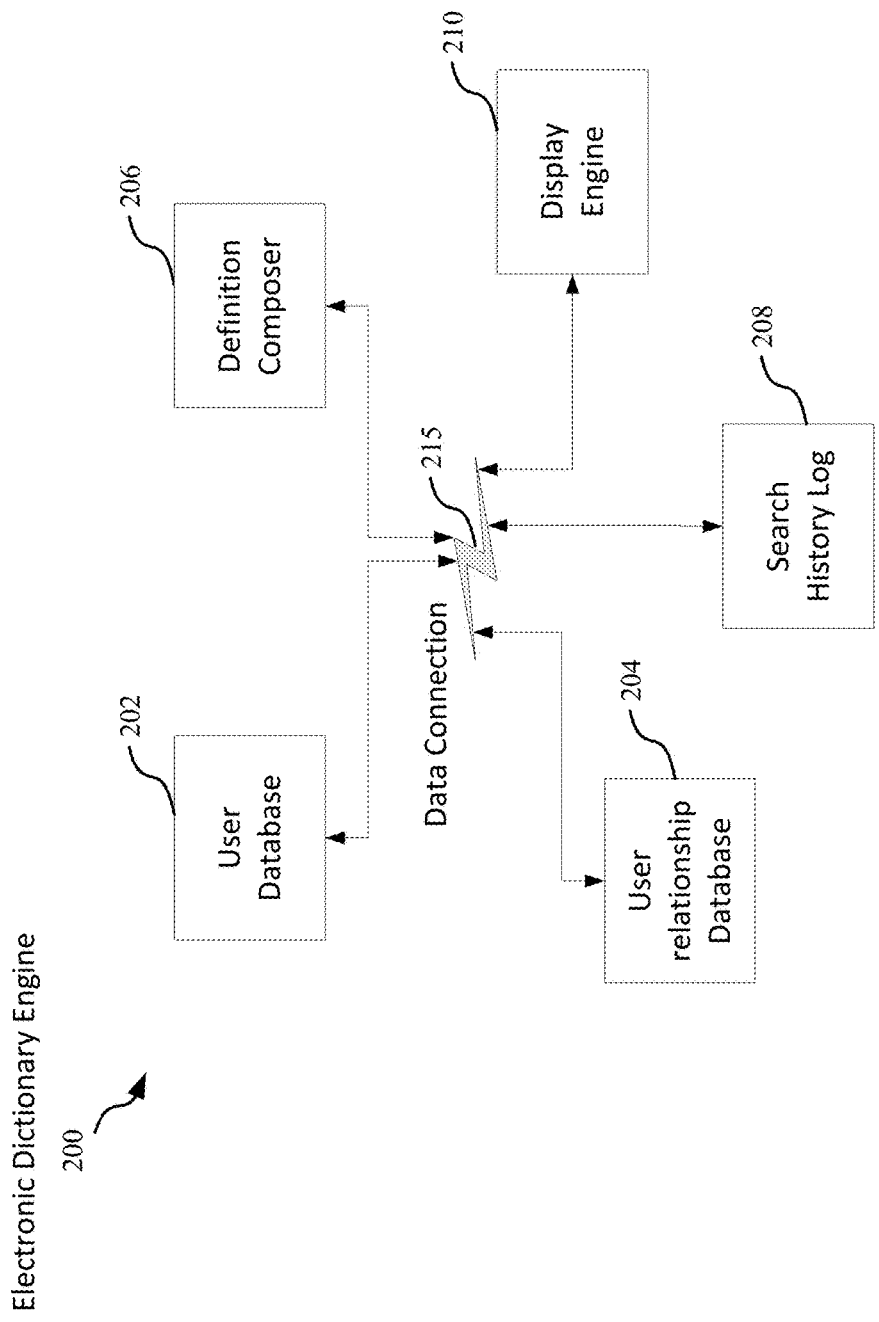
FIG. 2 is a schematic block diagram of an electronic dictionary engine according to one embodiment of the disclosure.

FIG. 2 is a schematic block diagram of an electronic dictionary engine 200 according to one embodiment of the disclosure. The electronic dictionary engine 200 may be the electronic dictionary engine 108 in FIG. 1. The electronic dictionary engine 200 may be used in combination with the personal dictionary engine 300 in FIG. 3. The electronic dictionary engine 200 may include the data structure 400 of a word entry in FIG. 4. The electronic dictionary engine 200 may implement wholly or partially the method 500 in FIG. 5. The electronic dictionary engine 200 may implement wholly or partially the method 600 in FIG. 6. The electronic dictionary engine 200 may be used in combination with the graphical user interface 700 in FIG. 7. The electronic dictionary engine 200 may be used in combination with the graphical user interface 800 in FIG. 8.

As shown in FIG. 2, the electronic dictionary engine 200 includes a user database 202, a user relationship database 204, a definition composer 206, a search history log 208, and a display engine 210. The user database 202, the user relationship database 204, the definition composer 206, the search history log 208, and the display engine 210 are connected through data connections 215.

The user database 202 may store user profile information including, but not limited to, name, date of birth, location, interests, education, language, ethnicity, education, communication methods, etc.

User relationship database 204 may store relationships. For example, if user A is a friend of user B, the relationship is stored in relationship database 204.

In one embodiment, the definition composer 206 retrieves and compiles definitions from definition databases 112 and personal dictionary engine 110. In one embodiment, upon receiving a search request, the definition composer 206 may retrieve user's profile from user database 202 for selecting appropriate definition databases 112. Definition composer 206 may proceed to retrieve definitions from the selected definition databases 112.

The method the definition composer 206 may retrieve definitions may depend on the type of definition database. For example, if the definition database is a relational database, the definition composer uses SQL to search and retrieve definitions. If the definition database is a Web Services on Internet, the definition composer may send a Web Services request to retrieve the definitions. In addition to the definition database 112, definition composer 206 may also retrieve definitions and notes from personal dictionary engine 110. Definition composer 206 may rank the definitions retrieved from various sources for display by the display engine 210.

In one embodiment, the definition composer 206 may select definition databases based on user's age, native language, and education. For example, if the user is an elementary student, a definition database for kids may be used. If the user's native language is Mandarin and the search word is English, an English-Chinese definition database may be used. As the user grows up, different definition databases may be used. Any information in the user profile may be used to select definition database.

The display engine 210 may be a graphical user interface related software and/or hardware. The display engine 210 may display the found definitions and notes on user device. The display engine 210 may format the displaying message according to the type of user device. For example, if the user device 104 is a computer with a web browser, the display engine 210 may create HTML code for displaying the definitions and notes. In another example, if the user device 104 is a mobile phone, the display engine 210 may create appropriate format to display on the mobile phone.

The search history log 208 may store the search event information. The information stored in the search history log 208 may include user identity, requesting location of the search, requesting time of the search, etc.

Figure 3:
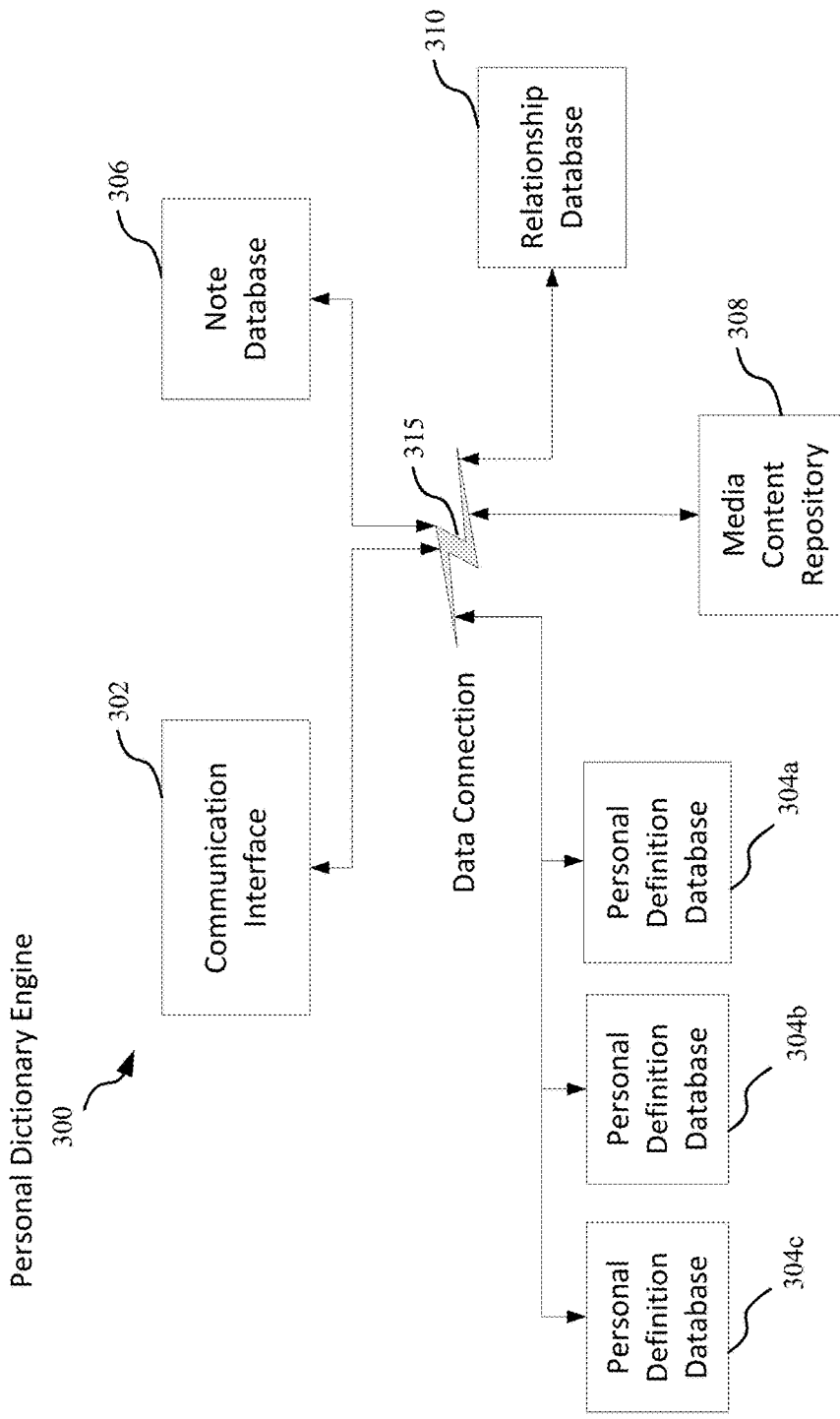
FIG. 3 is a schematic block diagram of an personal dictionary engine according to one embodiment of the disclosure.

FIG. 3 is a schematic block diagram of a personal dictionary engine 300 according to one embodiment of the disclosure. The personal dictionary engine 300 may be the personal dictionary engine 110 in FIG. 1. The personal dictionary engine 300 may be used in combination with the electronic dictionary engine 200 in FIG. 2. The personal dictionary engine 300 may include the data structure 400 of a word entry in FIG. 4. The personal dictionary engine 300 may implement wholly or partially the method 500 in FIG. 5. The personal dictionary engine 300 may implement wholly or partially the method 600 in FIG. 6. The personal dictionary engine 300 may be used in combination with the graphical user interface 700 in FIG. 7. The personal dictionary engine 300 may be used in combination with the graphical user interface 800 in FIG. 8.

The communications interface 302 may receive instructions for storing and requesting personal definitions and notes of a searched word or phrase.

The personal dictionary engine 300 may include one or more personal definition databases 304a, 304b and 304c (hereinafter personal definition database 304). A personal definition database 304a may store words and phrases and their definitions created by a user 102a, e.g., a personal definition. Another personal definition database 304b may store words and phrases and their definitions by another user 102b. In one embodiment, personal definitions created by all users may be stored in one personal definition database. A personal definition of a word entry may include any possible data elements defining the word. The elements may include, not limited to, functional label (noun, adjective, etc.), definition text, image, video, audio, etc. A personal definition may also comprise ancillary information such as the location of the user and date when the definition is created.

The note database 306 may store personal notes. Personal notes may be anything related to the searched word or phrase which helps the user understand the word. For example, personal notes may be an article in which the word is used, a sample sentence, a comic in which the word or phrase is used, etc. Personal notes may associate with a word or phrase itself. Personal notes may also associate with a personal definition of the word or phrase.

The media content repository 308 may store media contents added by users. The media contents can be, but not limited to images/pictures, sounds and videos.

The relationship database 310 may store relationships among words, users, definitions, and notes. For example, a relationship may be "definition A is created by user B" or "user C liked definition D". The relationships may exist in the form of foreign keys if the relationship database 310 is a relational database. The actual form of the relationships depends on the technologies used by the relationship database 310.

In one embodiment, user 102 may use user device 104 to take a picture, a video, and/or an audio and send them to the electronic dictionary engine 108 to be added as personal definition. Electronic dictionary engine 108 may send the identified word, user identification, picture, video or audio to the personal dictionary engine 300. Personal dictionary engine 300 saves the picture, video or audio in media content repository 308, linking the picture, video, or audio with the word or phrase identified in the relationship database 310.

In another embodiment, when the communication interface 302 receives commands for finding definitions of a word or phrase from a user device 104, the communications interface 302 may return popular personal definitions and notes created by other users (e.g., 102b, 102c) in addition to the user's own (e.g., 102a) personal definitions and notes. In one embodiment, a personal definition or note may be considered popular if the particular definition or note is liked by more than a predetermined number of other users. In another embodiment, the communication interface 302 may return definitions created near the user device's 104 location, as definitions of a word or phrase may have slightly different, localized meaning. In another embodiment, the communication interface 302 may return definitions from another user (e.g., 102b) that the requesting user (e.g., 102a) specifically likes or follows.

In another embodiment, a user 102 may send an URL to his/her friends asking for definitions of a word or phrase. His/her friends may open the URL in a browser and add definitions which can be stored in the definition database 304. Later on, the user 102 may review the definitions and may add the definitions that he/she likes to his/her personal dictionary.

Figure 4:
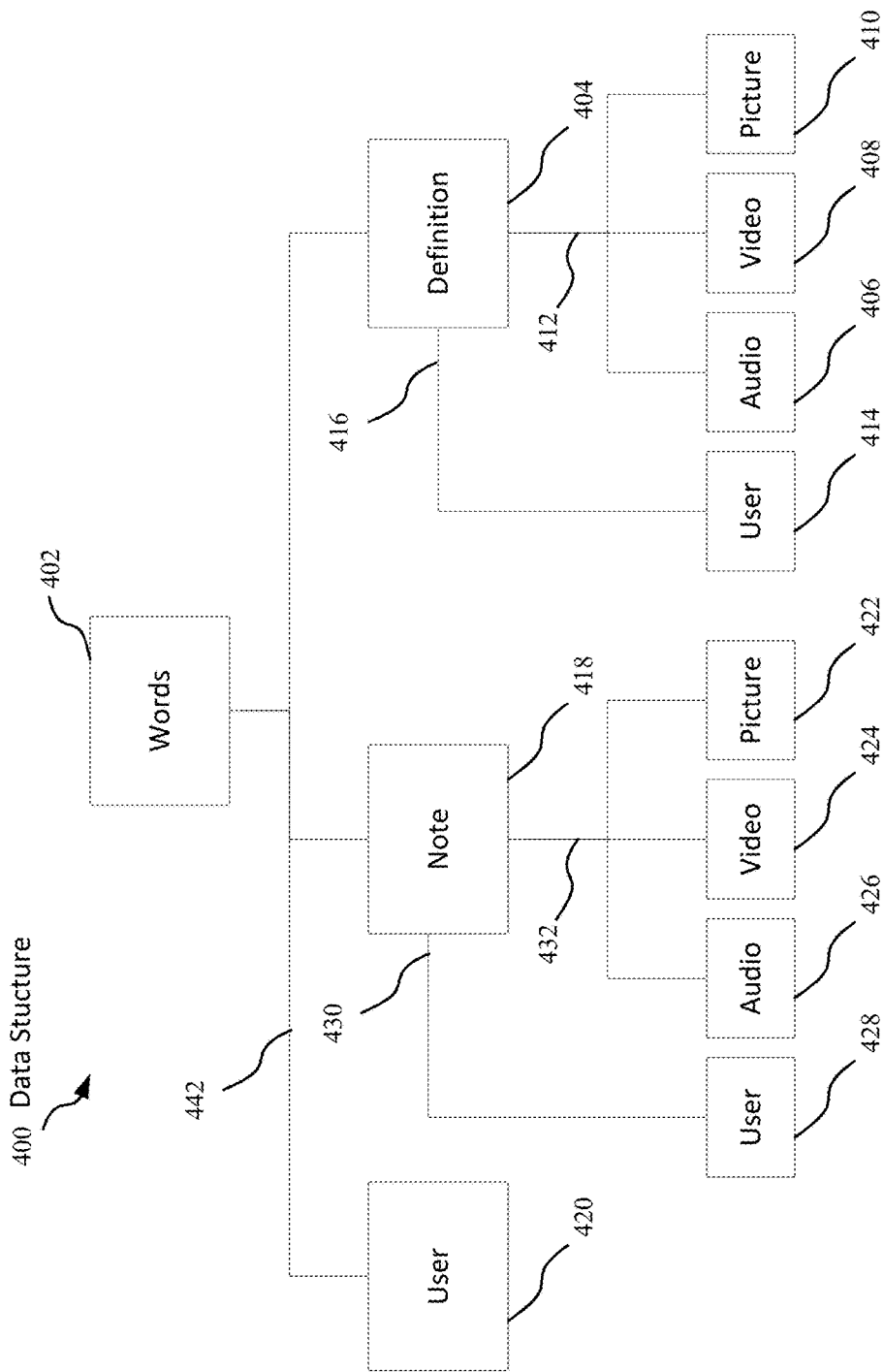
FIG. 4 is a schematic block diagram of a data structure of a word entry according to one embodiment of the disclosure.

FIG. 4 is a schematic block diagram of a data structure 400 of a word entry according to one embodiment of the disclosure. The data structure 400 may be included in the system 100 in FIG. 1. The data structure 400 may be used in combination with the electronic dictionary engine 200 in FIG. 2. The data structure 400 may be included in the personal dictionary engine 300 in FIG. 3. The data structure 400 may be included in the method 500 in FIG. 5. The data structure 400 may be included in the method 600 in FIG. 6. The data structure 400 may be included in the graphical user interface 700 in FIG. 7. The data structure 400 may be included in the graphical user interface 800 in FIG. 8.

Word 402 is a headword or head-phrase in a personal dictionary. Word 402 may be a word or phrase in any language. In one embodiment, Word 402 is an object, as in object-oriented languages, that comprises the headword or head-phrase and other information such as when and where the entry is created.

Definition 404 is a definition of the word 402 created by a user and may comprise functional label (e.g. noun, verb), definition text, pronunciation, and links to audio 406, video 408 and picture 410 that explain the headword or head-phrase. Definition 404 may also include location of the user and date and time when the definition is created. In one embodiment, the physical files of the audio 406, video 408 and picture 410 could be stored in media content repository 308 of personal dictionary engine 110 or any Internet connected storage.

Note 418 is a note associated with the word 402 created by a user and may include text, audio 426, video 424 and picture 422 that serve as a note that may help the user remember or understand the headword or head-phrase. Note 418 may also include location of the user and date and time when the note is created. In one embodiment, the physical files of the audio 426, video 424 and picture 422 could be stored in media content repository 308 of the personal dictionary engine 110 or any Internet connected storage.

In one embodiment, the link 412 may be pointers that point to the media file location of the audio 406, video 408 and picture 410. In another embodiment, the link 412 may be an URL or a file path, depending where the audio 406, video 408 and picture 410 are stored. In one embodiment, the link 412 may be text strings and stored as part of definition 404. In another embodiment, the link 412 may be a relationship and are stored as relationships in the relationship database 310.

In one embodiment, the link 432 may be pointers that point to the media file location of the audio 426, video 424 and picture 422. In another embodiment, the link 432 may be an URL or a file path, depending where the audio 426, video 424 and picture 422 are stored. In one embodiment, The link 432 may be text strings and stored as part of note 418. In another embodiment, the link 432 may be a relationship and stored as relationships in the relationship database 310.

The link 416 is a relationship indicating a user 414 likes definition 404. There may be multiple users 414 who like definition 404, thus there may be multiple links 416. In one embodiment, the link 416 may be stored as a relationship in the relationship database 310.

The link 430 is a relationship indicating a user 428 likes note 418. In one embodiment, the link 430 may be stored as a relationship in the relationship database 310.

Note 418 may store any text or multimedia content that helps explain but may not directly define the word or phrase 402. In one embodiment, for example, note 418 may be a sample sentence, an URL to a web page, or a page number in a book where the word and phrase can be found.

User 420 is the user who created the word or phrase entry 402. The link 442 is a relationship indicating that the user 420 created the word or phrase entry 402. In one embodiment, the relationship is stored in relationship database 310.

Figure 5:
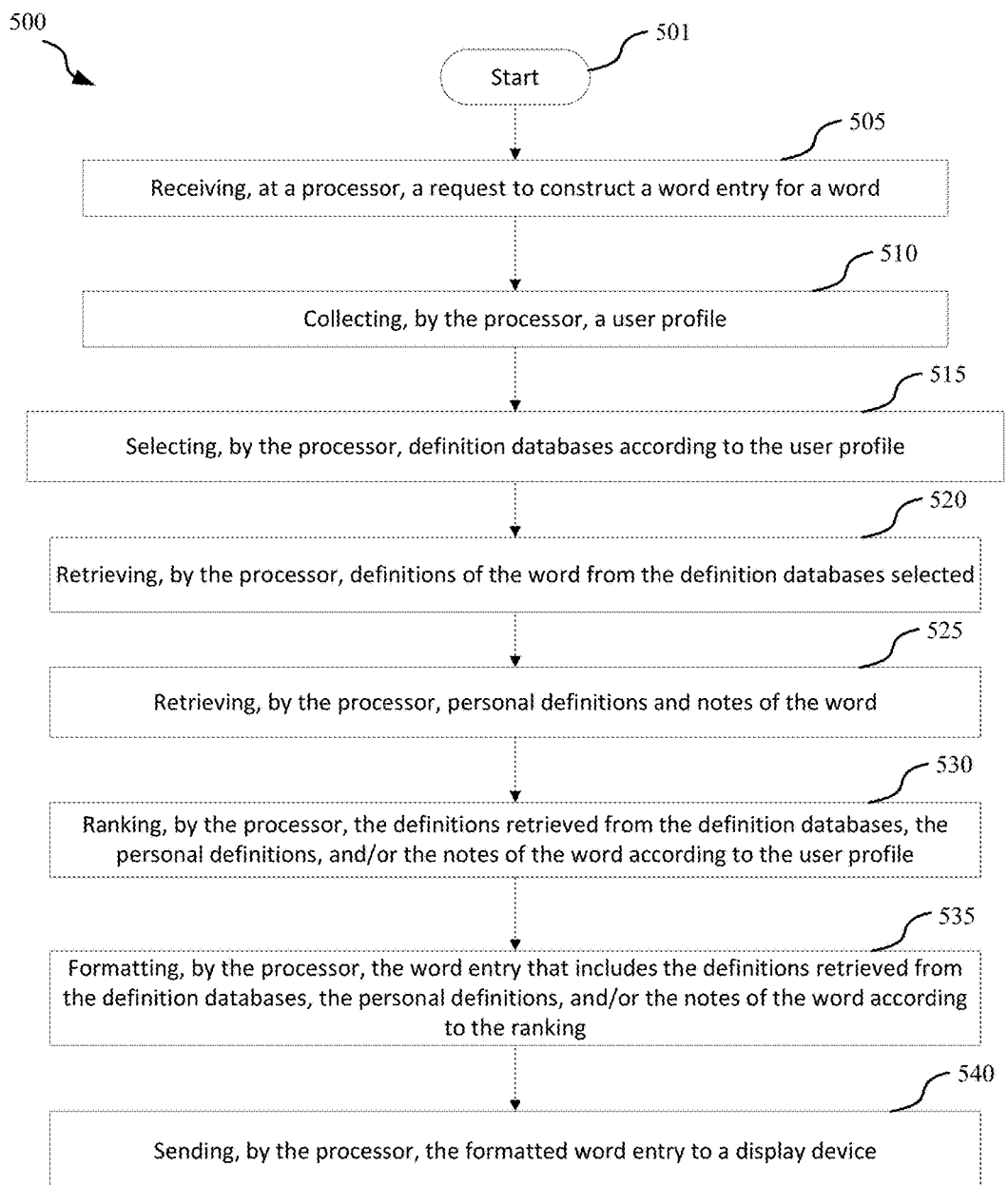
FIG. 5 is a method for constructing a word entry according to one embodiment of the disclosure.

FIG. 5 is a method 500 for constructing a word entry according to one embodiment of the disclosure. The method 500 may be implemented by the system 100 in FIG. 1. Some or all of the steps of the method 500 may be executed by the electronic dictionary engine 200 in FIG. 2. Some or all of the steps of the method 500 may be executed by the personal dictionary engine 300 in FIG. 3. The word entry constructed by the method 500 may include the data structure 400 in FIG. 4. The method 500 may be used in combination with the graphical user interface 700 in FIG. 7. The method 500 may be used in combination with the graphical user interface 800 in FIG. 8.

The method 500 starts at block 501. The method 500 proceeds to block 505, which includes receiving, at a processor, a request to construct a word entry of a word. The method 500 proceeds to block 510, which includes collecting, by the processor, a user profile. The method 500 proceeds to block 515, which includes selecting, by the processor, definition databases according to the user profile. The method 500 proceeds to block 520, which includes retrieving, by the processor, definitions of the word from the definition databases selected. The method 500 proceeds to block 525, which includes retrieving, by the processor, personal definitions and notes of the word. The method 500 proceeds to block 530, which includes ranking, by the process, the definitions retrieved from the definition databases, the personal definitions, and the notes of the word according to the user profile. The method 500 proceeds to block 535, which includes formatting, by the processor, the word entry that includes the definitions retrieved from the definition databases, the personal definitions, and/or the notes of the word according to the ranking. The method 500 proceeds to block 540, which includes sending, by the processor, the formatted word entry to a display device.

At block 505, the method 500 receives a request to construct a word entry of a word. In one embodiment, this request may be made by a user 102 through a user device 104. The word requested by the user 102 may be the word the user wish to learn.

At block 510, the method 500 collects a user profile. In one embodiment, the user profile may include background information of the user, e.g., age, ethnicity, sex, education level, native language, physical location, other users of the personal dictionary 101 who are the user's friends, etc.

At block 515, the method 500 selects definition databases according the user profile. The selection processor may use any of the information included in the user profile, e.g., age, ethnicity, sex, education level, native language, physical location, other users of the personal dictionary 101 who are the user's friends, etc. The definition databases may include any existing dictionaries, e.g., Merriam-Webster dictionary, Cambridge dictionary, Dictionary.com, TheFreeDictionary.com etc.

At block 520, the method 500 retrieves definitions of the word from the definition databases selected.

At block 525, the method 500 retrieves personal definitions and notes of the word. The personal definitions and notes may be previously entered by any of the users. In one embodiment, the personal definitions and notes may be previously entered by the user who made the request at 505. In one embodiment, the personal definitions and notes may be previously entered by any user other than the user who made the request at 505.

At block 530, the method 500 ranks (1) the definitions retrieved from the definition databases, (2) the personal definitions, and/or (3) the notes of the word according to the user profile. The ranking at 530 may consider any information of the user profile, e.g., age, ethnicity, sex, education level, native language, physical location, other users of the personal dictionary 101 who are the user's friends, etc.

At block 535, the method 500 formats the word entry that includes (1) the definitions retrieved from the definition databases, (2) the personal definitions, and/or (3) the notes of the word according to the ranking. In one embodiment, at 535, the method 500 may place the highest ranking definition of the word at the top of the entry for display. In one embodiment, at 535, the method 500 may place the lowest ranking definition of the word at the bottom of the entry for display.

At block 540, the method 500 sends the formatted word entry to a display device. The display device may be a mobile phone, a tablet, a laptop computer, a desktop computer, or the like. At 540, the method may use a display engine, e.g., display engine 210, to generate appropriate display format for a specific type of display device. The graphical user interface 700 in FIG. 7 may be an example of the formatted word entry generated at 540.

Figure 6:
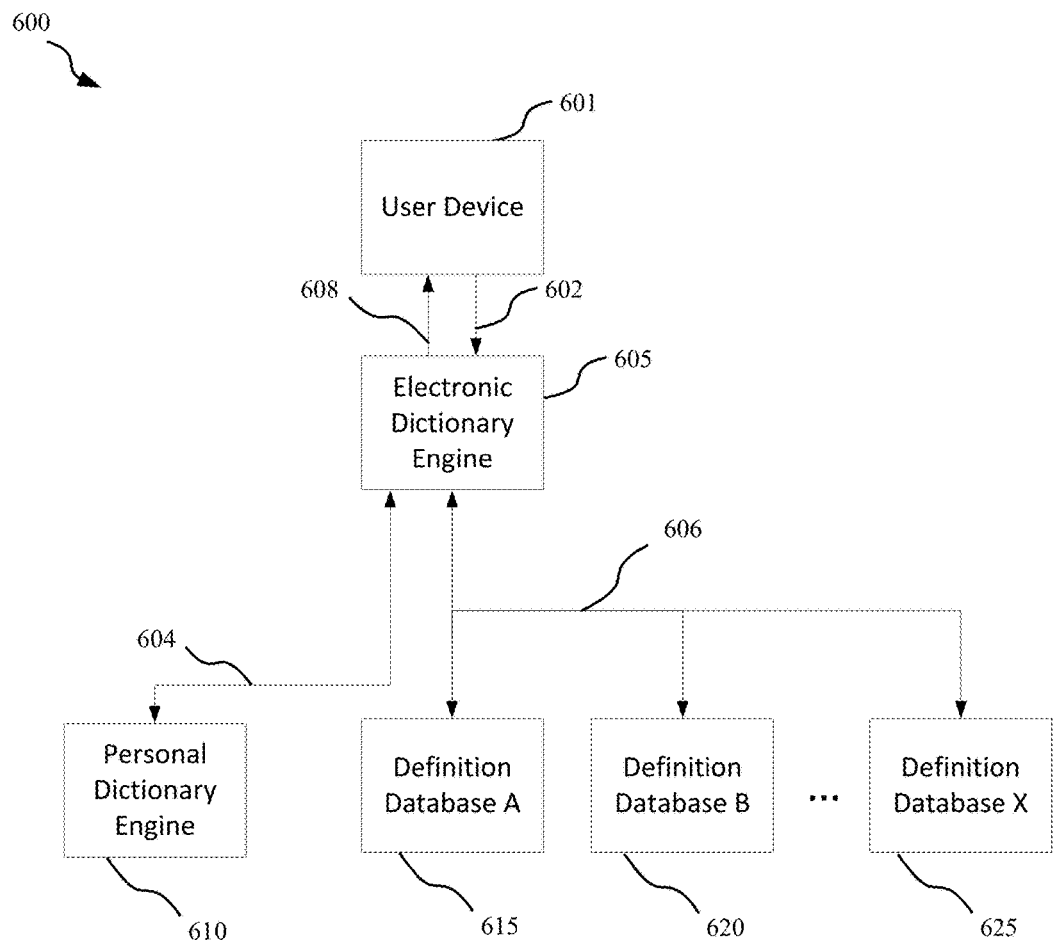
FIG. 6 is a schematic diagram of method for constructing a word entry according to one embodiment of the disclosure.

FIG. 6 is a schematic diagram of method 600 for constructing a word entry according to one embodiment of the disclosure. The method 600 may be implemented in the system 100 in FIG. 1. In one embodiment, the method 600 can include the electronic dictionary engine 108. The method 600 can include the electronic dictionary engine 200 in FIG. 2. The method 600 can included the personal dictionary engine 300 in FIG. 3. The method 600 may include the data structure 400 of a word entry in FIG. 4. The method 600 may include or be used in combination with the method 500 in FIG. 4. The method 600 may be used in combination with the graphical user interface 700 in FIG. 7. The method 600 may be used in combination with the graphical user interface 800 in FIG. 8.

In FIG. 6, when user 102 requests a search of a word or a phrase on the user device 601, user device 601 sends the request message 602 to the electronic dictionary engine 605. The message 602 may comprise the search word or phrase, user identity, user device location, etc. Upon receiving the message, a program running on electronic dictionary engine 605 finds the user's profile in the user database (e.g., user database 202) using the user identity in the message 602.

The electronic dictionary engine 605 then sends a request message 604 to personal dictionary engine 610 to retrieve personal definitions and notes for the search word or phrase. The personal dictionary engine may choose personal definitions that are likely to be understood by the requesting user 102. The request message 604 may include search word or phrase, user profile, user location, etc. In one embodiment, personal dictionary engine 610 may return definitions and notes created by the user 102, definitions liked by the user, and definitions liked by a predetermined number of other users. In another embodiment, personal dictionary engine 610 may return personal definitions created by other users near the user location. In another embodiment, personal dictionary engine 610 may return personal definitions created by other users with similar age as the user 102.

Further, the program on electronic dictionary engine 605 uses the user profile to choose appropriate definition databases 615, 620, 625 according to the user profile. The program then requests definitions from the chosen definition databases for the search word or phrase in message 606. The electronic engine 605 may rank among the selected definition databases 615, 620, 625. The ranking process may be similar to step 530 in FIG. 5. The contents are sent back to user device 601 in message 608. User device 601 displays the message 608 to user 102.

Figure 7:
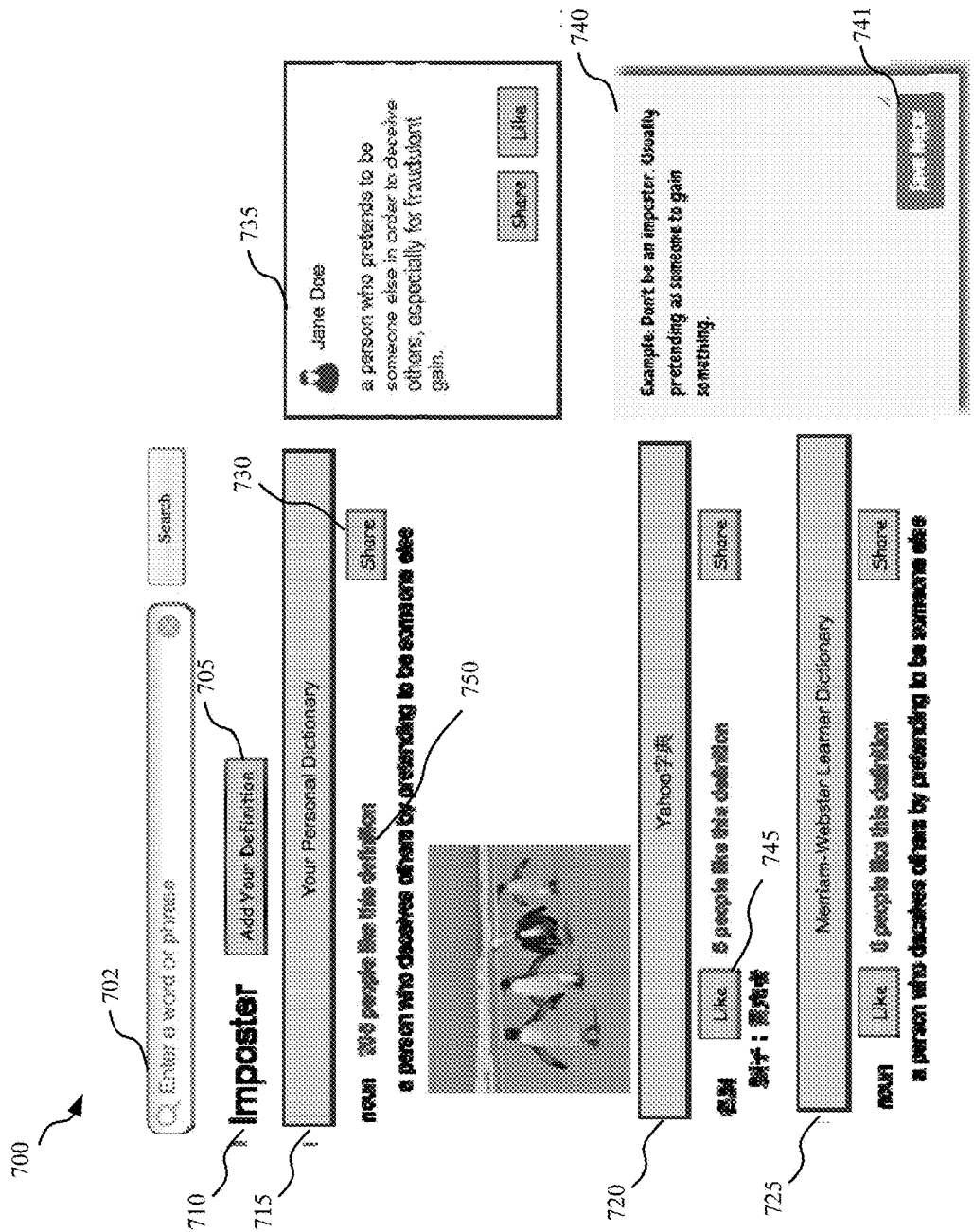
FIG. 7 is a graphical user interface of a personal dictionary according to one embodiment of the disclosure.

FIG. 7 is a graphical user interface 700 of a personal dictionary according to one embodiment of the disclosure. The graphical user interface 700 may be implemented with the system 100 in FIG. 1. The graphical user interface 700 may be implemented with the electronic dictionary engine 200 in FIG. 2. The graphical user interface 700 may be implemented with the personal dictionary engine 300 in FIG. 3. The graphical user interface 700 may be implemented with the data structure 400 in FIG. 4. The graphical user interface 700 may be implemented with the method 500 in FIG. 5. The graphical user interface 700 may be implemented with the method 600 in FIG. 6. The graphical user interface 700 may include the graphical interface 800 in FIG. 8.

FIG. 7 shows an exemplary graphical user interface (GUI) 700 of a personal dictionary, wherein the user is a native Mandarin speaker and an elementary school student. The GUI 700 includes a search box 702 for entering a search word or phrase. After clicking the search button in 702, the user device (e.g., user device 104) sends the request to the electronic dictionary engine (e.g., the electronic dictionary engine 108). The request may include the search word or phrase, the location of the user and user identity.

As shown in FIG. 7, the contents returned by electronic dictionary engine include 705, 710, 715, 720, 725, 730, 735, 740, 745. The word "Imposter" 710 is the searched word or phrase. The "Add Your Definition" button 705 allows the user to add his/her own definition. Personal definition 715 is a definition previously created by the user. As shown in FIG. 7, personal definition 715 comprises an image. In another embodiment, the personal definition 715 may include audio, video, and other multimedia contents. The 'Share' button 730 allows the user to share the definition to his or her friends.

Definition 720 is a definition of "Imposter" 710 from Yahoo English-Chinese dictionary. Yahoo English-Chinese dictionary may be selected and receive the highest ranking from the personal dictionary, because the electronic dictionary engine determined it fits the user profile the best, e.g., considering user's native language (Mandarin) and age (elementary school student). The "Like" button 745 may allow the user and other users to like this definition.

Definition 725 is a definition from Merriam-Webster Learner's dictionary. The Merriam-Webster Learner's dictionary may be selected because the user is an elementary student. In another embodiment, the Merriam-Webster Learner's dictionary may be selected if the user's first language is not English. The Merriam-Webster Learner's dictionary may be ranked lower than the Yahoo English-Chinese dictionary, because the user is a Mandarin speaking elementary student which the Merriam-Webster Learner's dictionary may not serve very well.

735 is a personal definition created by the user's friend Jane Doe. In one embodiment, 735 may be stored in Jane Doe's personal definition database. Note 740 is a personal notes created by the user. The user can enter his/her notes in 740. In one embodiment, the "Save Notes" button 741 sends the note to the electronic dictionary engine 108, which further saves the notes in personal dictionary engine 110.

Figure 8:
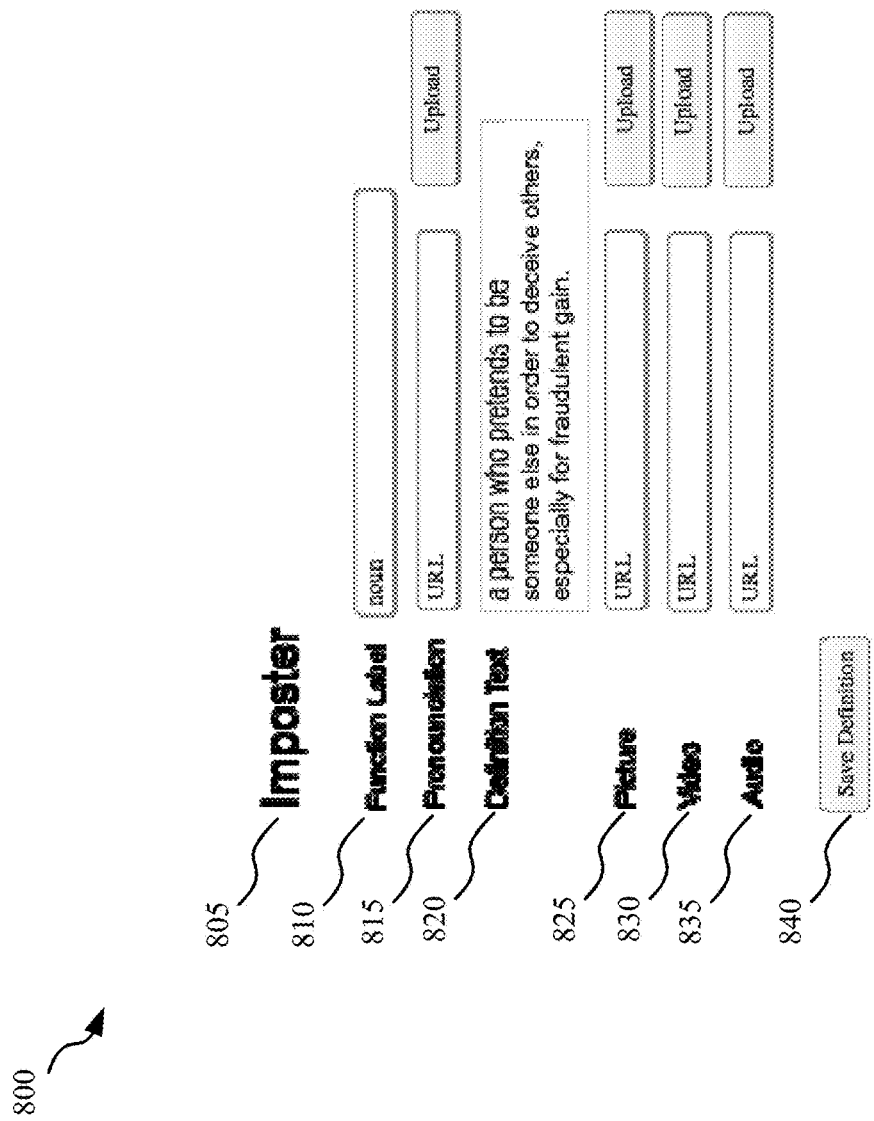
FIG. 8 is a graphical user interface of "add your definition" according to one embodiment of the disclosure.

FIG. 8 is a graphical user interface (GUI) 800 of "add your definition" according to one embodiment. The graphical user interface 800 may be implemented with the system 100 in FIG. 1. The graphical user interface 800 may be implemented with the electronic dictionary engine 200 in FIG. 2. The graphical user interface 800 may be implemented with the personal dictionary engine 300 in FIG. 3. The graphical user interface 800 may be implemented with the data structure 400 in FIG. 4. The graphical user interface 800 may be implemented with the method 500 in FIG. 5. The graphical user interface 800 may be implemented with the method 600 in FIG. 6. The graphical user interface 800 may be used in combination with the graphical interface 700 in FIG. 7.

In one embodiment, the GUI 800 is shown after user clicks the "Add Your Definition" button 705 in FIG. 7. "Imposter" 805 is the word or phrase for which the definition will be created. Block 810 may allow user to enter functional label such as noun, verb, adjective and etc. Block 815 may allow user to enter pronunciation. At block 815, user can elect to enter an URL to an audio file or upload his/her own. Block 820 may allow user to enter definition text.

Block 825 may allow user enter an URL of a picture file or upload his/her own picture. Block 830 may allow user to enter an URL of a video file or upload his/her own video. Block 835 may allow user to enter an URL to an audio file or upload his/her own audio. After clicking button 840, the definition is sent to e.g., electronic dictionary engine 108 and eventually saved in e.g., the personal dictionary engine 110.

It is noted the personal dictionary (e.g., personal dictionary 101) can be an apparatus that includes computer readable medium. The personal dictionary may also include a processor coupled to the computer readable medium, wherein the processor is configured to execute applicable instructions.

It is noted that the personal dictionary (e.g., personal dictionary 101) can be a computer program product. The computer program product may include a non-transitory computer readable medium that includes instructions. The instructions may be executed by a processor of a computing system, causing the processor to perform applicable instructions.

All computer readable medium or memory disclosed herein are non-transitory memory medium. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

When applicable, all the methods, computer program products, and/or apparatuses disclosed herein may include one or more non-transitory memory medium. The one or more non-transitory memory medium may include one or more partitions dedicated for storing the data processed by the methods, computer program products, and/or apparatuses. The methods, computer program products, and/or apparatuses disclosed herein may include one or more processors that are in data communication with the non-transitory memory medium. The methods, computer program products, and/or apparatuses disclosed herein may further include data input/output (IO) interface(s) that are in data communication with the processor. For example, the IO interfaces may include wired and/or wireless communication ports. The IO interfaces can be used by the processor in sending and/or receiving information. The methods, computer program products, and/or apparatuses disclosed herein may further include one or more graphical user interfaces (GUIs) showing on one or more electronic display screens, e.g., Liquid Crystal Display (LCD) screens. The processors may be in data communication with the electronic display screens and may update the GUIs according to the instructions executed by the processors.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for controlling a user device including a processor and a display, the display including a graphical user interface, the method comprising steps:
    receiving, at the processor, a request from a user to construct a word entry of a word, wherein the processor is in data communication with one or more non-transitory memory mediums;
    retrieving, by the processor, a user profile of the user from a non-transitory memory medium, wherein the user profile includes the user's native language and age;
    compiling, by the processor, a list of one or more definition databases according to the user's native language and age, wherein the list is stored in a partition of a non-transitory memory medium by the processor;
    ranking, by the processor, definitions of the word provided by the definition databases according to the user's native language and age, wherein the definition databases include a first, a second, and a third definition database,
        if the first definition database is appropriate for both the native language and the age of the user profile, the first definition database ranks first,
        if the second definition database is appropriate for the native language but not the age of the user profile, the second definition database ranks second,
        if the third definition database is appropriate for the age but not the native language of the user profile, the third definition database ranks third;
    retrieving, by the processor, a top ranked definition of the word from its corresponding definition database;
    formatting, by the processor, the definitions retrieved from the definition databases according to a resolution of the display of the user device; and
    displaying, by the processor, the formatted definitions on the graphical user interface of the display.

2. The method of claim 1, further including
    formatting, by the processor, the word entry that includes the definitions retrieved from the definition databases according to the ranking.

3. The method of claim 1, further including
    retrieving, by the processor, personal definitions and notes of the word from one or more non-transitory memory mediums.

4. The method of claim 1, further including
    receiving, by the processor, a request to enter personal definitions of the word.

5. The method of claim 1, further including
    receiving, by the processor, a request to enter personal notes of the word.

6. The method of claim 1, further including retrieving, by the processor, at least top three ranked definitions of the word from their corresponding definition databases.

7. A method for controlling a user device including a first processor and a display, the display including a graphical user interface, the method comprising steps:
    receiving, at a second processor, a request from a second user to enter a personal definition of a word, wherein the second processor is in data communication with one or more non-transitory memory mediums;
    storing, by the second processor, the personal definition in a partition of a non-transitory memory medium dedicated for a personal dictionary;
    receiving, at the first processor, a request from a first user to construct a word entry of the word;
    collecting, by the first processor, a user profile of the first user, wherein the user profile includes the first users' native language and age, wherein the first native language and age are similar to the second user's native language and age;
    selecting, by the first processor, definition databases according to the first user's native language and age, wherein the definition databases includes the personal definition entered by the second user;
    retrieving, by the first processor, definitions from the definition databases selected;
    ranking, by the first processor, the definitions retrieved from the definition databases according to the first user's native language and age, wherein the definition databases include a first, a second, and a third definition database,
        if the first definition database is appropriate for both the native language and the age of the user profile, the first definition database ranks first,
        if the second definition database is appropriate for the native language but not the age of the user profile, the second definition database ranks second, if the third definition database is appropriate for the age but not the native language of the user profile, the third definition database ranks third;

formatting, by the first processor, the definitions retrieved from the definition databases according to a resolution of the display of the user device; and displaying, by the first processor, the formatted definitions on the graphical user interface of the display.

8. The method of claim 7, further including formatting, by the first processor, the word entry that includes the definitions retrieved from the definition databases according to the ranking.

9. The method of claim 7, further including receiving, at the first processor, a request to like the personal definition entered by the second user.

10. The method of claim 7, further including receiving, by the first processor, a request to enter personal notes of the word.

11. The method of claim 7, further including receiving, at the first processor, a request to retrieve the personal notes.

12. The method of claim 7, further including retrieving, by the processor, at least top three ranked definitions of the word from their corresponding definition databases.

13. A device having a display and a non-transitory computer-readable medium comprising instructions which, when executed by a processor of the device, cause the processor to perform the steps of:

receiving a request from a user to construct a word entry of a word;

collecting a user profile of the user, wherein the user profile includes the user's native language and age;

retrieving a personal definition of the word from a partition of the non-transitory memory medium;

selecting definition databases according to the user's native language and age;

ranking the definitions retrieved from the definition databases according to the user's native language and age wherein the definition databases include a first, a second, and a third definition database, if the first definition database is appropriate for both the native language and the age of the user profile, the first definition database ranks first, if the second definition database is appropriate for the native language but not the age of the user profile, the second definition database ranks second, if the third definition database is appropriate for the age but not the native language of the user profile, the third definition database ranks third; and formatting the definitions retrieved from the definition databases according to a resolution of the display of the user device; and displaying the formatted definitions on a graphical user interface of the display.

14. The computer program product of claim 13, wherein the steps further include formatting the word entry that includes the definitions retrieved from the definition databases according to the ranking.

15. The computer program product of claim 13, wherein the steps further include receiving a request to like the personal definition.

16. The computer program product of claim 13, wherein the steps further include receiving a request to enter personal notes of the word.

17. The method of claim 13, further including retrieving, by the processor, at least top three ranked definitions of the word from their corresponding definition database.

* * * * *